(12) United States Patent
Chen

(10) Patent No.: US 10,768,509 B2
(45) Date of Patent: Sep. 8, 2020

(54) ON-CAMERA FLASHLIGHT

(71) Applicant: Yueqing Chuangyi Photography Equipment Co., Ltd., Yueqing (CN)

(72) Inventor: Qingyuan Chen, Leqing (CN)

(73) Assignee: YUEQING CHUANGYI PHOTOGRAPHY EQUIPMENT CO., LTD., Yueqing (CN)

( * ) Notice: Subject to any disclaimer, the term of this patent is extended or adjusted under 35 U.S.C. 154(b) by 0 days.

(21) Appl. No.: 14/795,626

(22) Filed: Jul. 9, 2015

(65) Prior Publication Data

US 2016/0202597 A1    Jul. 14, 2016

(30) Foreign Application Priority Data

Jan. 9, 2015 (CN) ..................... 2015 2 0015592 U

(51) Int. Cl.
| | | |
|---|---|---|
| *G03B 15/02* | (2006.01) | |
| *G03B 15/05* | (2006.01) | |
| *F21L 4/00* | (2006.01) | |
| *F21V 21/14* | (2006.01) | |
| *F21V 33/00* | (2006.01) | |
| *F21W 131/30* | (2006.01) | |

(52) U.S. Cl.
CPC ............... *G03B 15/02* (2013.01); *F21L 4/00* (2013.01); *F21V 21/14* (2013.01); *F21V 33/0052* (2013.01); *G03B 15/05* (2013.01); *F21W 2131/30* (2013.01); *G03B 2215/0521* (2013.01); *G03B 2215/0553* (2013.01); *G03B 2215/0567* (2013.01); *G03B 2215/0571* (2013.01)

(58) Field of Classification Search
CPC .......... F21L 4/00; F21V 21/14; F21V 33/052; G03B 15/02; G03B 15/05; G03B 2215/052; G03B 2215/0053; G03B 2215/0567; G03B 2215/0573; G03B 15/041; G03B 15/0431; G03B 2215/0521; G03B 2215/0553; G03B 2215/0571
See application file for complete search history.

(56) References Cited

U.S. PATENT DOCUMENTS 4,465,353 A * 8/1984 Yoshida ................... G03B 7/16
                                                  396/157
5,036,345 A * 7/1991 Kawano ................. G03B 15/05
                                                   362/18
5,136,312 A * 8/1992 Weaver ................... G03B 7/16
                                                  396/175

(Continued)

*Primary Examiner* — Peggy A Neils

(57) ABSTRACT

The present invention is an on-camera flashlight, comprising a lower light holder and a top light holder freely rotatably connected to the lower light holder. A flashlight light source is mounted on the top of the top light holder. The light emitting diode and the flashlight light source are mounted on the on-camera flashlight, combined for ease of use. Two functions-in-one lighting device saves space, avoids overloading the camera, and makes it portable. Because the two light sources are set in combination, the cooperation and sequence of the two light sources are easier to control. As the light emitting diode is mounted on the top light holder which may freely rotate with respect to the lower light holder, the light emitting diode may also freely rotate. It is also convenient to adjust the light direction. Above features all remarkably facilitate operation and versatility of the on-camera flashlight.

7 Claims, 1 Drawing Sheet

(56) References Cited

U.S. PATENT DOCUMENTS

| | | | | |
|---|---|---|---|---|
| 5,895,128 | A * | 4/1999 | Kishimoto | G03B 15/05 |
| | | | | 396/182 |
| 6,839,510 | B2 * | 1/2005 | Kameyama | G03B 15/05 |
| | | | | 396/176 |
| 8,160,435 | B2 * | 4/2012 | Okubo | G03B 15/05 |
| | | | | 396/175 |
| 8,736,710 | B2 * | 5/2014 | Spielberg | G03B 15/05 |
| | | | | 348/222.1 |
| 9,400,413 | B2 * | 7/2016 | Yamashita | G03B 15/03 |
| 2012/0121244 | A1 * | 5/2012 | Stavely | G02B 3/0056 |
| | | | | 396/175 |
| 2013/0004152 | A1 * | 1/2013 | Imafuji | G03B 15/02 |
| | | | | 396/155 |

* cited by examiner

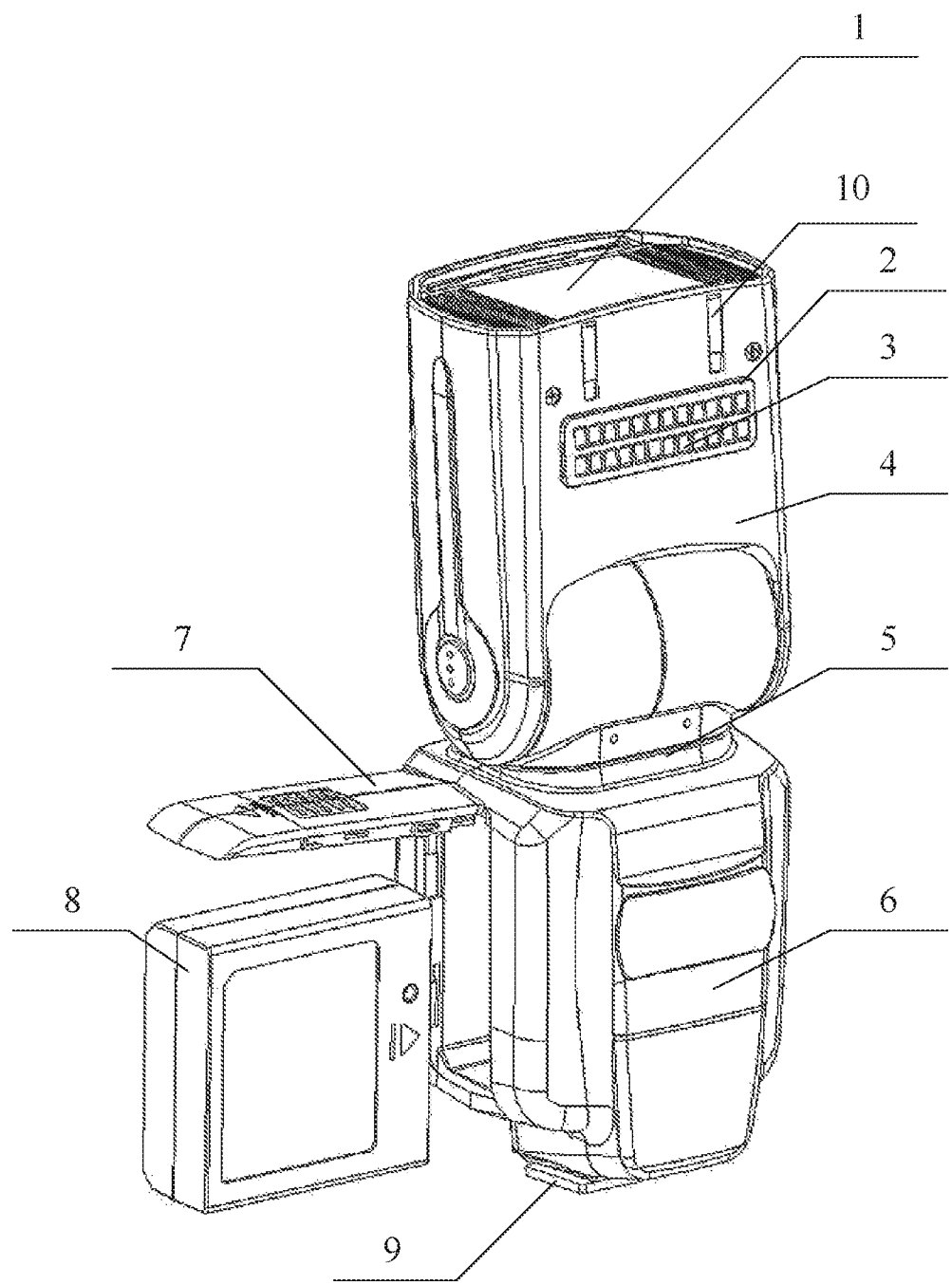

ON-CAMERA FLASHLIGHT

TECHNICAL FIELD

The present invention relates to the technical filed of photographic equipment, and in particular to an on-camera flashlight.

BACKGROUND

Camera flashlight, a photographic accessory for light-sensing in photography, produces strong emissions of light in a short time span. It is typically used for instant lighting under low light conditions and also for providing fill light to a subject under conditions in which the background has relatively abundant light. On-camera flashlight is a separate electronic flashlight and connected to a camera in use. It has relatively high power, has multiple functions and is capable of being mounted on cameras of various types.

The currently available flashlights in the art are attributed with having the following problems: the majority of on-camera flashlights and LED (light emitting diode) light source currently in the market are generally two separate lighting devices, while in use, the light emitting diode is often used as a device to fill light during photographing; the flashlight and the light emitting diode for fill light are separately mounted, which not only require more space to mount the devices but also require more apparatus for connection and cooperation of the parts. Therefore, such multiple separate lighting devices in the prior art are not only difficult to operate but also lead to high costs and ineffective, inefficient cooperation between the different devices. In addition, since the light source of flashlight and the fill light source of LED are separately mounted, it is also difficult to separately adjust the two light sources. During photographing, when the lighting direction of light source of flashlight is determined, it can only provide light at a fixed direction if the direction of the fill light of the LED is not adjusted separately, and thus it is difficult to adapt to different photographing environment.

As explained, overcoming the problem of ineffective and inefficient cooperation between the light source of flashlight and the light source of light emitting diode of the on-camera flashlight is an issue that needs to be addressed and resolved by persons of skill in the art.

SUMMARY OF THE INVENTION

The present invention aims to provide an on-camera flashlight whose design in structure may effectively provide a way to direct the light source of light emitting diode of the on-camera flashlight to provide light in multiple directions.

In order to achieve the above purpose, the present invention provides the following technical solution.

An on-camera flashlight, comprising a lower light holder and a top light holder rotatably connected to the lower light holder, in which a flashlight light source is mounted on the top of the top light holder. On the side where the top light holder is mounted facing the lens of the camera, a light emitting diode with high wattage is provided and disposed for fill light as a constant light source.

The on-camera flashlight, between the lower light holder and the top light holder, also includes a free rotating holder for connecting the lower light holder and the top light holder.

In the on-camera flashlight, the free rotating holder and the top light holder are connected via a pin.

In the on-camera flashlight, there is provided within the on-camera flashlight a lithium battery for supplying power.

In the on-camera flashlight, a battery holder is mounted in the lower light holder and the lithium battery is positioned within the battery holder.

In the above on-camera flashlight, the lower light holder is provided with a cavity for housing the battery holder. The battery holder is mounted in the cavity, capable of being taken out. At the opening of the cavity, there is provided with a baffle capable of being opened and closed.

In the above on-camera flashlight, a fixed base is freely rotatably connected to the base of the lower light holder.

In the above on-camera flashlight, a light emitting diode light holder capable of sliding up and down is mounted on the top light holder and a light emitting diode with high wattage is provided within the light emitting diode light holder.

The on-camera flashlight of the present invention includes a lower light holder and a top light holder freely rotatably connected to the lower light holder. A flashlight light source is mounted on the top of the top light holder. On the side where the top light holder is mounted facing the lens of the camera, a light emitting diode with high wattage for fill light is provided as a constant light source. The light emitting diode with high wattage, along with the flashlight light source, is mounted on the on-camera flashlight, and thus the two light sources are combined during photographing, facilitating operation and versatility of the camera flashlight. Moreover, the combination of the two light sources helps to save space, avoiding too much space being occupied by light source devices. In addition, two functions may be accomplished by one light emitting device rather than the conventional two different light sources. Saving space and reducing the number of devices all help to reduce the size and weight of the flashlight device, making it portable and convenient to carry. Since the two light sources are set in combination, the cooperation and sequence of the two light sources are made easier to control. In addition, like the flashlight light source, the light emitting diode with high wattage is also mounted on the top light holder in which the top light holder is capable of freely rotating with respect to the lower light holder. Because the light emitting diode with high wattage can also freely rotate via the top light holder, it is convenient to adjust the light direction and remarkably facilitate the operation of flashlight and the associated light sources, thereby solving the difficulty in lack of cooperation between the convention flashlight light source and its light emitting diode counterpart in the on-camera flashlight.

DESCRIPTION OF THE DRAWINGS

Hereinafter, embodiments are described with reference to the accompanying drawings in order to better illustrate technical solution in embodiments of the present invention. The embodiments illustrated below are not meant to limit the scope of the invention as defined in the Claims.

FIG. 1 is a structural schematic of the on-camera flashlight provided in embodiments of the present invention, with the baffle open and the battery holder being taken out.

Symbols used in the drawing are as follows:

1 is a flashlight light source, 2 is a light emitting diode light holder, 3 is a light emitting diode with high wattage, 4 is a top light holder, 5 is a free rotating holder, 6 is a lower light holder, 7 is a baffle, 8 is a battery holder, and 9 is a fixed base.

DETAILED DESCRIPTION OF THE INVENTION

Embodiments of the present invention discloses an on-camera flashlight to solve the issue concerning light emitting diode light source of the on-camera flashlight that conventionally cannot provide light in multiple directions.

Hereinafter, technical solution in embodiments of the present invention is fully described, taken in conjunction with a drawing of an embodiment of the present invention. The embodiments illustrated below are not meant to limit the scope of the invention as defined in the Claims. FIG. 1 is a structural schematic of the on-camera flashlight provided in embodiments of the present invention, with the baffle open and the battery holder being taken out.

The on-camera flashlight provided in the present invention includes a lower light holder 6 and a top light holder 4 freely rotatably connected to the lower light holder 6. A flashlight light source 1 is mounted on the top of the top light holder 4. On the side where the top light holder 4 is mounted facing the lens of the camera, a light emitting diode with high wattage 3 for fill light is provided as a constant light source. During normal working state of an on-camera flashlight, the top light holder 4 is bent down towards the direction of the lens while the light emitting diode with high wattage 3 is mounted on the side of the top light holder 4 capable of being bent down.

The light emitting diode with high wattage 3, along with the flashlight light source 1, is mounted on the on-camera flashlight, and thus the two light sources are combined during photographing, facilitating operation of the on-camera flashlight. Moreover, the combination of the two light sources helps to save space, avoiding two much space being occupied by light source devices. In addition, two functions may be accomplished via one device rather than the conventional two different light sources, and thus on-camera flashlight becomes more portable and convenient to carry. Since the two light sources are set in combination, the cooperation and sequence of the two light sources are easier to control. In addition, like the flashlight light source 1, the light emitting diode with high wattage 3 is also mounted on the top light holder 4. The top light holder 4 is capable of freely rotating with respect to the lower light holder 6, and thus the light emitting diode with high wattage 3 can also be freely rotate via the top light holder 4. Therefore, is the on-camera flashlight is made more convenient to adjust the light direction of the two light sources, which remarkably facilitates the operation of the flashlight. For the above, the on-camera flashlight provided in the present utility model is convenient to carry, facilitates the operation of flashlight and overcomes the difficulty of lack of cooperation between the flashlight light source 1 and light source of light emitting diode 3 in the conventional on-camera flashlight.

Further, an embodiment of the present invention provides, in the on-camera flashlight, between the lower light holder 6 and the top light holder 4, a free rotating holder 5 for connecting the lower light holder 6 and the top light holder 4. The free rotating holder 5 includes two main components, one is a rotation recess and the other is a holder body mounted in the rotation recess, wherein one is mounted on the top light holder 4 and the other is mounted on the lower light holder 6, thus allowing free rotation function of the free rotating holder 5.

With the above design of the free rotating holder 5, it is not only simple in design but also can effectively allow the free rotation of the top light holder 4 with respect to the lower light holder 6.

Preferably, in the on-camera flashlight, the free rotating holder 5 and the top light holder 4 are connected via a pin structure.

The above embodiments describe the technical solutions regarding free rotation of the top light holder 4 with respect to the lower light holder 6. The above free rotation of the top light holder with respect to the lower light holder, however, only allows the two holders to freely rotate on the same plane, but the top light holder 4 cannot rotate up and down with respect to the lower light holder 6. Pin connection is a simple but stable way for rotation connection. With pin connection, the top light holder 4 may rotate up and down in the vertical direction with respect to the lower light holder 6, which realizes the relative rotation function of the two holders within horizontal as well as vertical planes.

Further, in another embodiment of the present invention, the on-camera flashlight is provided with an internal lithium battery for supplying power.

The power supply of the on-camera flashlight in the present embodiment uses a lithium battery mainly for the following advantages: it may be recharged for multiple times and thus may be repeatedly used; voltage platform of lithium battery is high; when compared with other batteries of the same kind, the lithium battery has higher energy density; when compared with lead-acid batteries, the lithium battery is lighter in weight; service life of lithium battery is relatively longer, which can reach up to 6 years; more importantly, lithium battery has high power endurance, and because flashlight entails a high power electric application with high power consumption in a short period of time, lithium battery is well suited to the use of flashlight; in addition, it is environment friendly and does not contain or generate any toxic and harmful metal element and substance during its production, use or disposal.

Further, an embodiment of the present invention provides the on-camera flashlight, in which the lower light holder 6 includes a battery holder 8, and a lithium battery is mounted within the battery holder 8.

The present invention in which a battery holder 8 is mounted within the on-camera flashlight for housing the lithium battery helps to better secure the lithium battery, stabilize the external working environment and avoid damage to the battery. In addition, the lithium battery mounted within the on-camera flashlight can also reduce the hassle and additional operation involved in assembly and arrangement and thus is convenient to use. The reason for mounting the battery holder 8 on the lower light holder 6 rather than the top light holder 4 is to reduce space and allow easier rotation movement and the like. This is because the free rotation of top light holder 4 will be affected if the lithium battery with some weight is mounted on the top light holder 4.

Further to the above embodiments of the present invention regarding the on-camera flashlight, the lower light holder 6 is provided with a cavity for housing the battery holder 8. The battery holder 8 is mounted in the cavity, capable of being taken out. At the opening of the cavity, there is provided with a baffle 7 which may be opened and closed. It needs to illustrate that the battery holder 8, while in operation, is located within the cavity. When it needs to charge or change the lithium battery, the baffle 7 may be opened to take out the battery holder 8 for the lithium battery.

The design of the above embodiments provides an improvement in which the battery holder 8 is housed within the lower light holder 6. It helps to save external space, provides a tight arrangement of the internal structure of the on-camera flashlight, and leads to a simple outlook. It is more streamlined and beautiful in design.

Further to the above embodiments of the present invention regarding the on-camera flashlight, a fixed base 9 is rotatably connected to the base of the lower light holder 6.

For the design in which a fixed base 9 is added to the base of the lower light holder 6, it may enable the on-camera flashlight provided in the embodiment to better adapt to different types of camera; meanwhile it may improve the flexibility in adjusting direction of flashlight. When compared to the design where the lower light holder 6 is directly connected to the camera body, this design may better adapt to different types of camera.

Further to the above embodiments of the present invention regarding the on-camera flashlight, there is provided, on the top light holder 4, two sliding grooves 10 that are symmetrically arranged, and a light holder 2 of light emitting diode 3 which is able to slide up and down along the sliding grooves 10. The light emitting diode with high wattage 3 is mounted within the light holder 2 of the light emitting diode 3.

In the above embodiments, a series of technical solutions for rotating the top light holder 4 so as to adjust the light emitting diode with high wattage 3 have already been disclosed. However, they do not disclose how to provide subtle adjustment in the lighting position via the light emitting diode 3 without having to adjust the lighting direction. For this reason, the present implementation provides a slidable light holder 2 and the sliding grooves 10, which permits the light emitting diode 3 slides in parallel to subtly adjust the lighting position, and thus providing maximum light movement of the light emitting diode with high wattage for adjusting lighting position.

Each embodiment herein is described in a progressive manner, with the focus of each embodiment different from all other embodiments, and the identical portion between different embodiments may be referred to each other.

With the above description of the disclosed embodiments, persons skilled in the art become enabled to understand, practice, and implement the present invention. In addition, various modifications to those embodiments will also become apparent to persons skilled in the art. The general principle defined herein may be realized in other embodiments without departing from the spirit or scope of the present invention. Therefore, the present utility model will not be limited to those embodiments as illustrated herein, but should be in accordance with the broadest scope having the same principle and novel characteristics as disclosed herein.

I claim:

1. An on-camera flashlight, comprising a lower light holder and a top light holder freely rotatably connected to the lower light holder; a flashlight light source disposed on a top portion of the top light holder; a high wattage light emitting diode disposed on a side of the top light holder facing a lens of the camera for providing fill light as a constant light source.

2. The on-camera flashlight of claim 1, wherein a free rotating holder between the lower light holder and the top light holder is provided for connecting the lower light holder and the top light holder.

3. The on-camera flashlight of claim 2, wherein the free rotating holder and the top light holder are connected by a pin structure.

4. The on-camera flashlight of claim 1, wherein the on-camera flashlight includes a lithium battery for supplying power.

5. The on-camera flashlight of claim 4, wherein the lower light holder includes a battery holder and the lithium battery is mounted within the battery holder.

6. The on-camera flashlight of claim 5, wherein the lower light holder includes a cavity for housing the battery holder, and the battery holder is releasably mounted within the cavity, and the opening of the cavity includes a baffle capable of being opened and closed.

7. The on-camera flashlight of claim 1, wherein a light emitting diode light holder capable of sliding up and down is mounted on the top light holder and is comprised of the high wattage light emitting diode mounted therein; wherein the top light holder comprises two sliding grooves that are symmetrically arranged and configured for the the light emitting diode light holder to slide up and down along the two sliding groves, so that the light emitting diode slides subtly adjust a lighting position.

\* \* \* \* \*